(12) United States Patent
Han et al.

(10) Patent No.: US 11,036,595 B2
(45) Date of Patent: Jun. 15, 2021

(54) SEMICONDUCTOR SYSTEM INCLUDING FAULT MANAGER

(71) Applicant: ELECTRONICS AND TELECOMMUNICATIONS RESEARCH INSTITUTE, Daejeon (KR)

(72) Inventors: Jin Ho Han, Seoul (KR); Min-Seok Choi, Daejeon (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 183 days.

(21) Appl. No.: 16/117,403

(22) Filed: Aug. 30, 2018

(65) Prior Publication Data
US 2019/0108105 A1    Apr. 11, 2019

(30) Foreign Application Priority Data

Oct. 11, 2017   (KR) .................. 10-2017-0131523
Feb. 26, 2018   (KR) .................. 10-2018-0022658

(51) Int. Cl.
*G06F 11/14*   (2006.01)
*G06F 11/07*   (2006.01)

(52) U.S. Cl.
CPC ........ *G06F 11/1471* (2013.01); *G06F 11/076* (2013.01); *G06F 11/0793* (2013.01);
(Continued)

(58) Field of Classification Search
CPC ............... G06F 11/1471; G06F 11/076; G06F 11/0793; G06F 2201/88; G06F 2201/82; G06F 2201/805
(Continued)

(56) References Cited

U.S. PATENT DOCUMENTS 5,835,698 A *  11/1998  Harris .................. H04L 41/0654
                                                          714/15
6,591,335 B1    7/2003  Sade et al.
(Continued)

FOREIGN PATENT DOCUMENTS

| KR | 19990057809 | 7/1999 |
| KR | 10-2001-0010293 A | 2/2001 |
| WO | 2007035747 A2 | 3/2007 |

OTHER PUBLICATIONS

Wikipedia IPMI page, retrieved from https://en.wikipedia.org/wiki/Intelligent_Platform_Management_Interface (Year: 2021).*

*Primary Examiner* — Yair Leibovich

(57) ABSTRACT

Provided is a semiconductor system including: a fault detector configured to obtain fault information related to a fault occurring in a first intellectual property (IP); a fault manager configured to store recovery information providing one or more recovery methods related to the fault information and determine a recovery method for recovering the fault occurring in the first IP among the one or more recovery methods based on the recovery information; and a fault recovery module configured to control the first IP based on the determined recovery method. The determined recovery method involves communication between the first IP and a second IP and the fault occurring in the first IP is recovered based on data delivered according to the communication between the first IP and the second IP.

13 Claims, 8 Drawing Sheets

(52) U.S. Cl.
CPC .... *G06F 2201/805* (2013.01); *G06F 2201/82* (2013.01); *G06F 2201/88* (2013.01)

(58) Field of Classification Search
USPC .......................................................... 714/15
See application file for complete search history.

(56) References Cited

U.S. PATENT DOCUMENTS

| | | | |
|---|---|---|---|
| 7,966,514 B2 | 6/2011 | Surasinghe | |
| 8,051,247 B1 | 11/2011 | Favor et al. | |
| 9,529,654 B2 | 12/2016 | Kwon et al. | |
| 9,830,218 B2 | 11/2017 | Han et al. | |
| 2002/0178416 A1* | 11/2002 | Chen | G06F 11/27 714/733 |
| 2009/0125755 A1* | 5/2009 | Herscovitz | G06F 11/0757 714/15 |
| 2017/0115350 A1* | 4/2017 | Zhang | G01R 31/3177 |

* cited by examiner

FIG. 5

| Address | Status Information (INF1) |
|---|---|
| Address 1 | Operation performed by fault-tolerant IP (INF1_1) |
| Address 2 | Input data when IP fault occurs (INF1_2) |
| Address 3 | Output data when IP fault occurs (INF1_3) |

FIG. 6

| Fault Type | Recovery Control Method |
|---|---|
| 1000, 1010, 1011 | 00 |
| 1100, 1110, 0100, 0110 | 01 |
| 1001, 0010, 0001, 0011 | 10 |
| 1111, 1101, 0111, 0101 | 11 |

SEMICONDUCTOR SYSTEM INCLUDING FAULT MANAGER

CROSS-REFERENCE TO RELATED APPLICATIONS

This U.S. non-provisional patent application claims priority under 35 U.S.C. § 119 of Korean Patent Application Nos. 10-2017-0131523, filed on Oct. 11, 2017, and 10-2018-0022658, filed on Feb. 26, 2018, the entire contents of which are hereby incorporated by reference.

BACKGROUND

The present disclosure herein relates to a semiconductor system, and more particularly, to a semiconductor system that performs a fault-tolerant function.

Today, many machines and devices include a variety of semiconductor systems to provide users with various convenience functions. For example, transportation means such as airplanes and automobiles may include a microprocessor for performing various convenience functions. In addition, electronic devices for implementing the Internet of Things (IoT) may include various computing devices.

Semiconductor systems may also be included in machines and devices for operating in harsh environments. The operation of semiconductor systems may be affected by ambient conditions such as temperature, humidity and pressure. Therefore, when the semiconductor system operates in a harsh environment, faults may occur in Intellectual Property (IP) included in the semiconductor system.

In order to operate the semiconductor system in harsh environments, the semiconductor system may be configured to perform a fault-tolerant function. A semiconductor system that performs a fault-tolerant function, i.e., a fault-tolerant system, may include a plurality of fault-tolerant IPs. If a fault occurs in fault-tolerant IP, since the performance of the overall system may be degraded, a fault-tolerant system for efficiently recovering faults is required.

SUMMARY

The present disclosure is to provide a semiconductor system that performs a function for recovering a fault.

An embodiment of the inventive concept provides a semiconductor system including: a fault detector configured to obtain fault information related to a fault occurring in a first intellectual property (IP); a fault manager configured to store recovery information providing one or more recovery methods related to the fault information and determine a recovery method for recovering the fault occurring in the first IP among the one or more recovery methods based on the recovery information; and a fault recovery module configured to control the first IP based on the determined recovery method. The determined recovery method involves communication between the first IP and a second IP and the fault occurring in the first IP is recovered based on data delivered according to the communication between the first IP and the second IP.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings:

FIG. 5 is a table showing example data representing status information of FIG. 4;

FIG. 6 is a table showing data stored in a fault controller of FIG. 3 in relation to example recovery information;

DETAILED DESCRIPTION

In the following, embodiments of the inventive concept will be described in detail so that those skilled in the art easily carry out the inventive concept.

Figure 1:
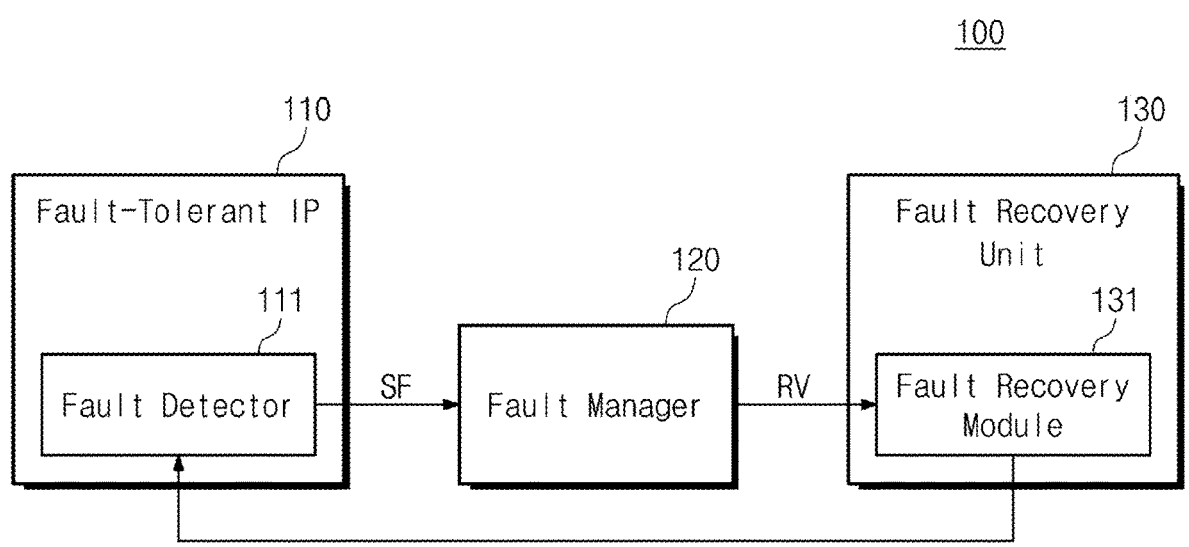
FIG. 1 is a block diagram illustrating a fault-tolerant system according to an embodiment of the inventive concept.

FIG. 1 is a block diagram illustrating a fault-tolerant system according to an embodiment of the inventive concept.

Referring to FIG. 1, a fault-tolerant system 100 may include a fault-tolerant IP 110, a fault manager 120, and a fault recovery unit 130. The fault-tolerant IP 110 may include a fault detector 111. The fault recovery unit 130 may include a fault recovery module 131.

For example, the fault-tolerant system 100 may be a semiconductor system configured to perform functions for recovering a fault. The fault-tolerant system 100 may be implemented in one electronic device. For example, the fault-tolerant system 100 may be implemented as a mobile device such as a smart phone and a personal digital assistant (PDA) and a computing device such as a desktop computer, a laptop computer, and a workstation. In this case, the fault-tolerant IP 110 may be one of a processor, a memory, a storage, a communication device, a bus, and the like, as a component of a mobile device or a computing device.

Alternatively, the fault-tolerant system 100 may be implemented as one or more electronic devices. For example, the fault-tolerant system 100 may include an Internet of Things (IoT) system. In this case, the fault manager 120 and the fault recovery unit 130 may be implemented as servers. The fault-tolerant system may be implemented as one terminal device. That is, the fault-tolerant IP 110 may perform the inherent or given functions and operations required depending on the use, function, and operation of the semiconductor system (e.g., the fault-tolerant system 100).

The fault detector 111, the fault manager 120, and the fault recovery module 131 may be implemented as one or more hardware devices. For example, the fault detector 111, the fault manager 120, and the fault recovery module 131 may be implemented as a hardware circuit (e.g., analog circuit and logic circuit) to perform the operations described below. Alternatively, as an example, the fault detector 111, the fault manager 120, and the fault recovery module 131 may be implemented as program code to perform the operations described below, and may be executed by one of a general purpose processor, a workstation processor, an application processor, and the like. For example, the fault detector 111, the fault manager 120, and the fault recovery module 131 may include dedicated circuits (e.g., Field Programmable Gate Arrays (FPGAs)), Application Specific Integrated Circuits (ASICs), or System on Chip (SoC) including one or more processor cores.

Figure 10:
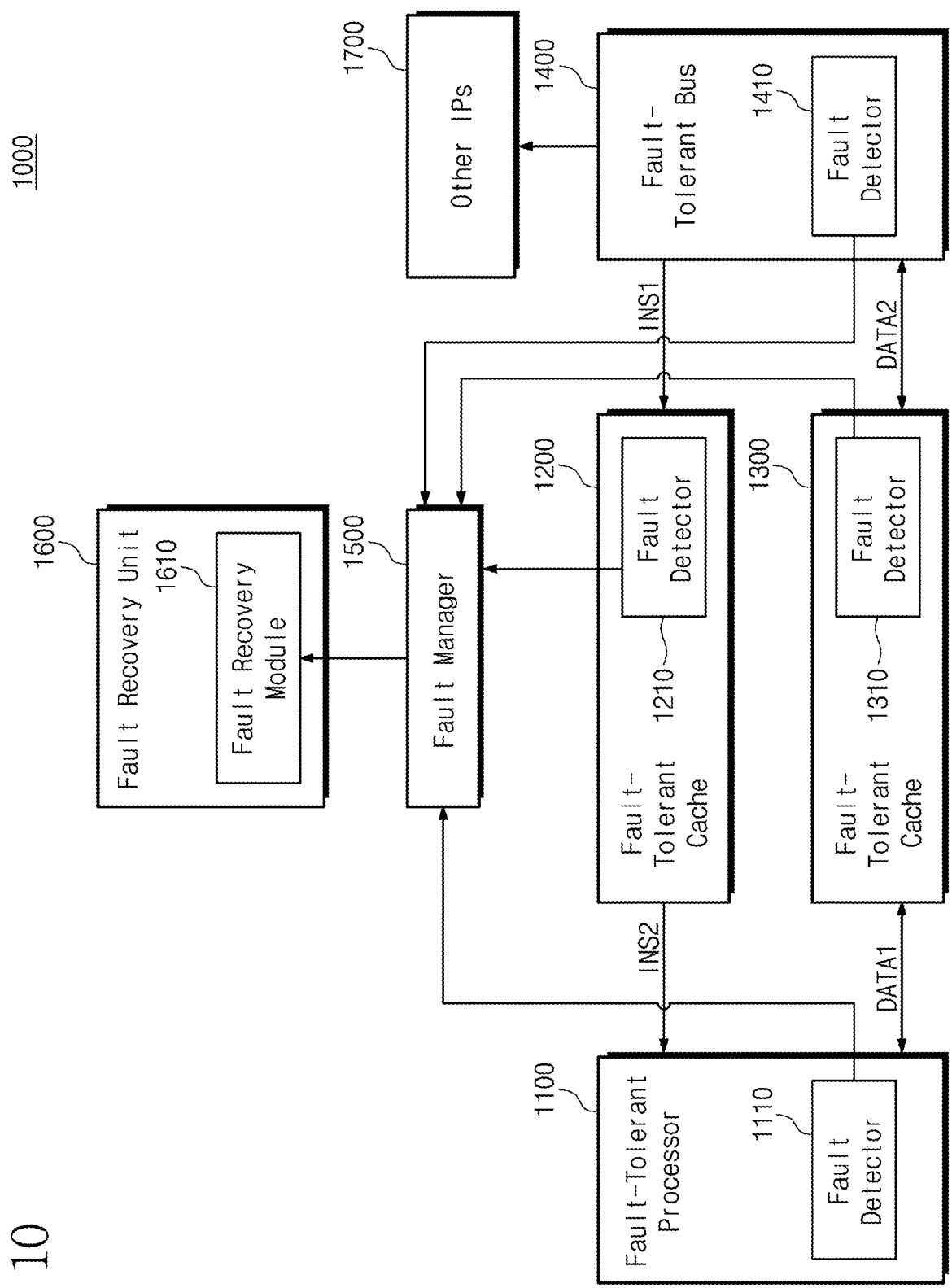
FIG. 10 is a block diagram illustrating a fault-tolerant system according to an embodiment of the inventive concept.

As an example, the fault-tolerant IP 110 may include at least one of a fault-tolerant processor, a fault-tolerant bus, and a fault-tolerant cache (refer to FIG. 10). The fault-tolerant IP 110 may operate based on a clock generated from a clock generator (refer to FIG. 7).

If a fault occurs in the fault-tolerant IP 110, the fault detector 111 may obtain information related to the fault (hereinafter, referred to as fault information). The fault may include a safe fault and a severe fault. The safe fault herein is a fault that may be recovered only by the operation of the fault-tolerant IP 110. The severe fault herein is a fault that may not be recovered by the operation of the fault-tolerant IP 110. The severe fault may be recovered according to the operation of the fault recovery module 131 included in the fault recovery unit 130.

The fault detector 111 may obtain status information of the fault-tolerant IP 110. The status information means information related to the operation performed by the fault-tolerant IP 110 when a fault occurs. Referring to FIG. 5, the status information will be described in more detail. When a fault occurs, the fault detector 111 may generate a signal SF for transmitting the status information.

The fault detector 111 may obtain fault occurrence information of the fault-tolerant IP 110 when a fault occurs. The fault occurrence information means information related to a fault occurring in the fault-tolerant IP 110. For example, the fault occurrence information may relate to whether the type of fault occurring in the fault-tolerant IP 110 is a safe fault or a severe fault. The fault detector 111 may generate a signal SF for transmitting fault occurrence information.

The fault information may include status information and fault occurrence information. The fault detector 111 may output a signal SF indicating data of status information and fault occurrence information to the fault manager 120.

The fault manager 120 may receive the signal SF from the fault detector 111 of the fault-tolerant IP 110. The fault manager 120 may obtain the status information and the fault occurrence information of fault-tolerant IP 110 from the signal SF. The fault manager 120 may count the number of faults (the number of safe faults and the number of severe faults) occurring in the fault-tolerant IP 110 based on the fault occurrence information. For example, the fault manager 120 may include a counter for counting the number of faults that occurred in the fault-tolerant IP 110.

The fault information may include a counted number of faults. The fault manager 120 may store data indicating fault information (e.g., status information, fault occurrence information, and a counted number of faults). For example, the fault manager may include a register for storing the data (refer to FIG. 3).

The fault manager 120 may determine a recovery method for recovering the IP fault. The recovery method refers to a method for controlling the fault-tolerant IPs and/or the fault recovery unit 130 to recover a fault of the fault-tolerant IP 110. The fault manager 120 may use information (hereinafter referred to as recovery information) that provides one or more recovery methods related to specific fault information to determine the recovery method. The fault manager 120 may store recovery information to determine a recovery method.

Figure 7:
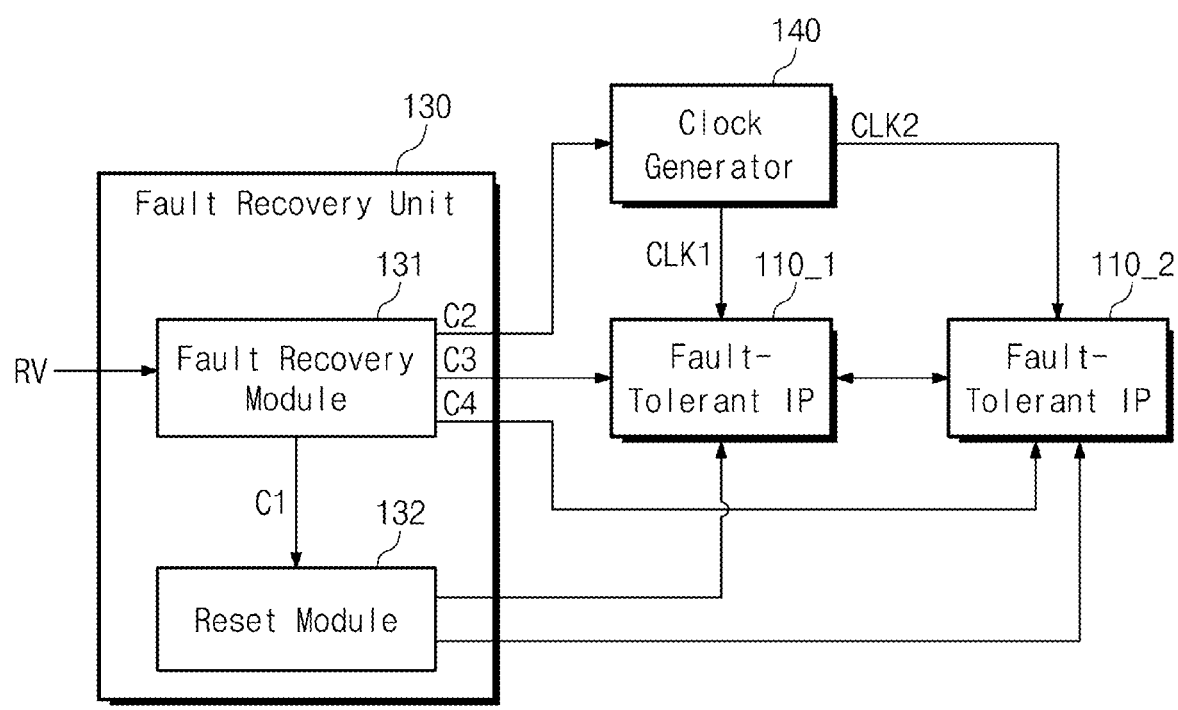
FIG. 7 is a block diagram illustrating an example configuration of a fault recovery unit of FIG. 1 or 2.

For example, the fault manager 120 may store a look-up table including data related to one or more recovery methods. As an example, data in a look-up table may be inputted from an external device (e.g., user interface, memory, and processor). Referring to FIGS. 6 and 7, the recovery method will be described in more detail.

Figure 3:
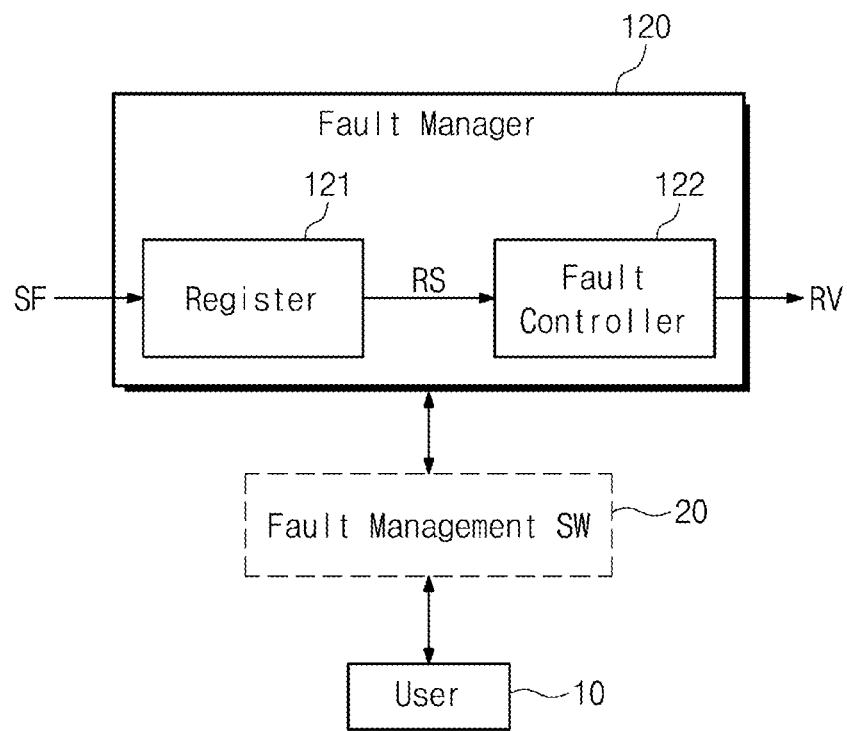
FIG. 3 is a block diagram illustrating an example configuration of a fault manager of FIG. 1 or 2.

The fault manager 120 may determine a recovery method based on fault information (e.g., fault occurrence information, status information, and counted number of faults), and a look-up table. Alternatively, the fault manager 120 may determine a recovery method according to a command inputted from a user through software (refer to FIG. 3). The fault manager 120 may generate a signal RV for delivering information associated with the determined recovery method. The fault manager 120 may output the signal RV to the fault recovery module 131 of the fault recovery unit 130. Referring to FIG. 3, the fault manager 120 will be described in more detail.

The fault recovery module 131 may receive the signal RV from the fault manager 120. The fault recovery module 131 may control the operation of the fault-tolerant system 100 to recover the fault of the fault-tolerant IP 110 based on the signal RV. For example, the fault recovery module 131 may control the operation of the fault-tolerant IP 110. Alternatively, the fault recovery module 131 may control a clock generator and a reset module (refer to FIG. 7).

Figure 2:
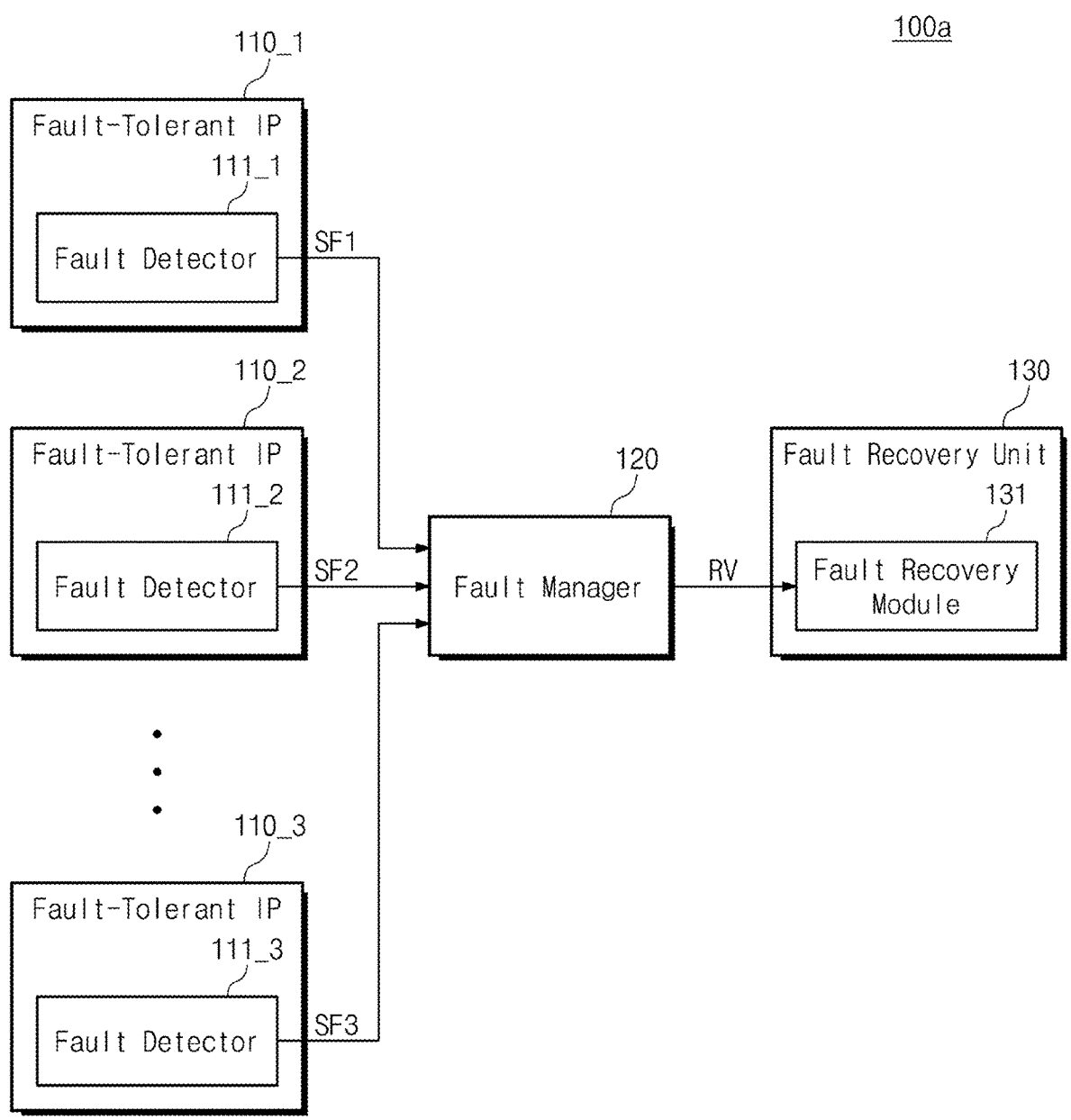
FIG. 2 is a block diagram illustrating a fault-tolerant system according to an embodiment of the inventive concept.

FIG. 2 is a block diagram illustrating a fault-tolerant system according to an embodiment of the inventive concept. For example, the fault-tolerant system 100 of FIG. 1 may be implemented as a fault-tolerant system 100*a* of FIG. 2.

Referring to FIG. 2, the fault-tolerant system 100*a* may include a plurality of fault-tolerant IPs 110_1 to 110_3, a fault manager 120, and a fault recovery unit 130. The fault-tolerant IPs 110_1 to 110_3 may include fault detectors 111_1 to 111_3, respectively. The fault recovery unit 130 may include a fault recovery module 131. The configurations and operations of the fault-tolerant IPs 110_1 to 110_3 are similar to the configuration and operation of the fault-tolerant IP 110 of FIG. 1, so that the following description is omitted. FIG. 2 shows a fault-tolerant system 100*a* including three or more fault-tolerant IPs 110_1 to 110_3, but the inventive concept may include all embodiments of a fault-tolerant system including one or more fault-tolerant IPs.

For example, as described with reference to FIG. 1, each of the fault-tolerant IPs 110_1 to 110_3 may be a component for configuring a computing device or a mobile device. The fault detectors 111_1 to 111_3 may generate signals SF1 to SF3, respectively, in order to deliver information related to faults occurring in the fault-tolerant IPs 110_1 to 110_3. Each of the signals SF1 to SF3 may be configured and used identically or similarly to the signal SF of FIG. 1. The fault detectors 111_1 to 111_3 may output each of the signals SF1 to SF3 to the fault manager 120.

The fault manager 120 may obtain fault information associated with a fault occurring in the fault-tolerant IPs 110_1 to 110_3, based on the signals SF1 to SF3. For example, the fault manager 120 may obtain status information and fault occurrence information of each of the fault-tolerant IPs 110_1 to 110_3.

The fault manager 120 may obtain fault information of all the fault-tolerant IPs 110_1 to 110_3 in the fault-tolerant system 100*a*. Accordingly, the fault manager 120 may determine the recovery methods in consideration of the operation involving communication between the fault-tolerant IPs 110_1 to 110_3 as well as the operation of each of the fault-tolerant IPs 110_1 to 110_3. For example, the fault manager 120 may determine recovery methods based on signals exchanged between the fault-tolerant IPs 110_1 to 110_3.

As an example, the designer of the fault-tolerant system 100a may determine recovery methods that include operations involving communication between fault-tolerant IPs 110_1 to 110_3 in consideration of the data delivered between the fault-tolerant IPs 110_1 to 110_3 according to the relationship between the fault-tolerant IPs 110_1 to 110_3. The fault manager 120 may store a look-up table including data of recovery methods determined by the designer or external device. The fault manager 120 may determine a recovery method based on fault information (e.g., status information, fault occurrence information, and number of faults) obtained from the signals SF1 to SF3 and a stored look-up table. Alternatively, the fault manager 120 may determine a recovery method according to a command inputted from a user through software (refer to FIG. 3).

The fault manager 120 may generate a signal RV for delivering information associated with the recovery method. The fault manager 120 may output the signal RV to the fault recovery module 131.

FIG. 3 is a block diagram illustrating an example configuration of the fault manager of FIG. 1 or 2.

Referring to FIG. 3, the fault manager 120 may include a register 121 and a fault controller 122. The register 121 may receive the signal SF from the fault detector 111 of FIG. 1. The register 121 may obtain status information and fault occurrence information of the fault-tolerant IP 110 based on the signal SF. The register 121 may store data indicating status information and fault occurrence information.

Although not shown in FIG. 3, the fault manager 120 may include a counter for counting the number of faults. The counter may count the number of faults that occur in the fault-tolerant IP 110 based on the fault occurrence information. The counter may output a signal to the register 121 to deliver a counted number of faults.

The register 121 may obtain the number of faults that occur in the fault-tolerant IP 110 based on the signal received from the counter. As an example, the register 121 may obtain the number of safe faults that occur in the fault-tolerant IP 110. Alternatively, the register 121 may obtain the number of severe faults occurring in the fault-tolerant IP 110. The register 121 may store data indicating the number of faults.

The register 121 may generate a signal RS for delivering fault information of the fault-tolerant IP 110 (e.g., status information, fault occurrence information, and a counted number of faults). The register 121 may output the signal RS to the fault controller 122. The fault controller 122 may receive the signal RS from the register 121. The fault controller 122 may obtain fault information of the fault-tolerant IP 110 from the signal RS.

The fault controller 122 may store a look-up table including data of the recovery method. Referring to FIG. 5, an example look-up table including data of the recovery method will be described in detail. The fault controller 122 may determine a new recovery method to recover the fault of the fault-tolerant IP 110 based on the fault occurrence information, the counted number of faults, and the look-up table.

If the determined recovery method includes an operation for resetting the fault-tolerant IP 110, the fault controller 122 may again determine the recovery method for the reset fault-tolerant IP 110 based on the status information. The resetting means an operation for initializing the operation state and/or data of the fault-tolerant IP 110. For example, the resetting may be an operation for deleting the setting value of the fault-tolerant IP 110 by controlling the power supply to the fault-tolerant IP 110 (e.g., by temporarily shutting off the power supply) and for controlling the fault-tolerant IP 110 to operate with the initial setting value. As an example, the resetting may include an operation for formatting a storage device included in the fault-tolerant IP 110.

Then, the fault controller 122 may control the resettled fault-tolerant IP 110 according to the new recovery method by outputting the signal to the reset fault-tolerant IP 110. For example, by outputting the signal to the reset fault-tolerant IP 110, the fault controller 122 may control the reset fault-tolerant IP 110 so that it does not receive data from other components.

A user 10 outside the fault-tolerant system 100 may access data stored in the register 121 through software. For example, the user 10 may access data stored in the register 121 through a fault management SW 20, which is software for accessing the fault manager 120. For example, the user 10 may be provided with information related to the data accessed through the fault management SW 20 by a user interface device (not shown). For example, the user 10 may be provided with fault information of the fault-tolerant device 110 by the user interface device.

The user 10 may control the operation of the fault controller 122 through the fault management SW 20. For example, the user 10 may determine a recovery method for the fault-tolerant IP 110 based on the information provided through the fault management SW 20. The user 10 may input a command for controlling the fault controller according to the determined recovery method through the fault management SW 20. The fault controller 122 may determine the recovery method according to the command of the user 10 inputted through the fault management SW 20.

The fault controller 122 may generate a signal RV for delivering information associated with the recovery method (e.g., a recovery method determined based on the signal SF and/or a recovery method determined according to an instruction of the user 10) determined according to the method described with reference to FIG. 3. The fault controller 122 may output the signal RV to the fault recovery module 131 of the fault recovery unit 130.

Although the operation for determining the recovery method for one fault-tolerant IP 110 by the fault manager 120 is described with reference to FIG. 3, the inventive concept may include all embodiments for determining the recovery methods for one or more fault-tolerant IPs by the fault manager 120. For example, the fault manager 120 may determine recovery methods for the fault-tolerant IPs 110_1 to 110_3 of FIG. 2 in a manner similar to that described with reference to FIG. 3.

Figure 4:
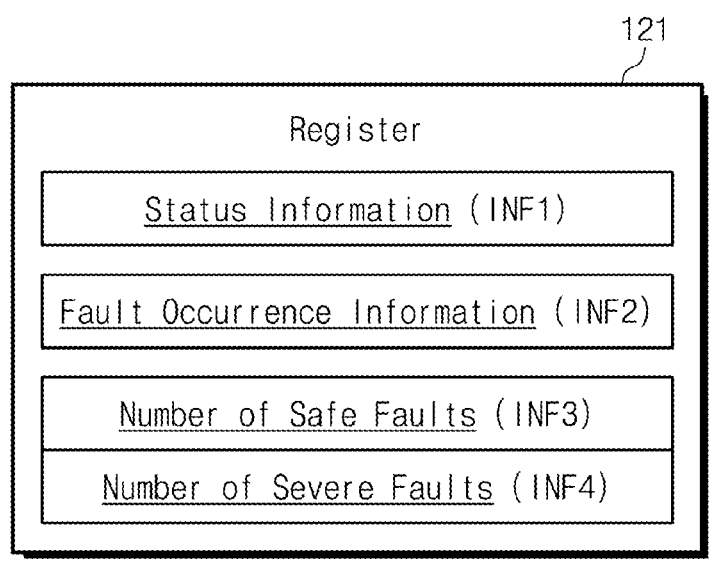
FIG. 4 is a block diagram illustrating example data stored in a register of FIG. 3.

FIG. 4 is a block diagram illustrating example information stored in the register of FIG. 3.

As described with reference to FIG. 3, the register 121 may obtain the status information INF1 and the fault occurrence information INF2 based on the signal SF received from the fault detector 111. In addition, the register 121 may obtain the number of safe faults INF3 and the number of severe faults INF4 based on the signal received from the counter.

The register 121 may store data indicating the status information INF1, data indicating the fault occurrence information INF2, data indicating the number of safe faults INF3, and data indicating the number of severe faults INF4.

Each of the status information INF1, the fault occurrence information INF2, the number of safe faults INF3, and the number of severe faults INF4 may be represented by one or more bits of data. Each of the data indicating the status information INF1, the data indicating the fault occurrence information INF2, the data indicating the number of safe faults INF3, and the data indicating the number of severe faults INF4 may be stored in specific locations corresponding to specific addresses of the register 121. Hereinafter, the status information INF1 will be described in more detail with reference to FIG. 5.

FIG. 5 is a table showing example data representing the status information of FIG. 4.

Referring to FIG. 5, data indicating status information INF1 may be stored at positions corresponding to address 1 to address 3. The status information INF1 may include information INF1_1 related to the operation performed by the fault-tolerant IP 110 when a fault occurs. As an example, the information INF1_1 may relate to the calculation operation of the fault-tolerant IP 110 based on the input data received from a specific module. The status information INF1 may include information INF1_2 related to data inputted to the fault-tolerant IP 110 when a fault occurs. The status information INF1 may include information INF1_3 related to data outputted from the fault-tolerant IP 110 when a fault occurs.

The register 121 may store data indicating the information INF1_1 at a position corresponding to the address 1. The register 121 may store data indicating the information INF1_2 at a position corresponding to the address 2. The register 121 may store data indicating the information INF1_3 at a position corresponding to the address 3.

As described with reference to FIG. 3, the register 121 may output a signal RS for delivering the status information INF1 to the fault controller 122. The signal RS may indicate a specific address and data stored at a specific address. The signal RS may indicate data corresponding to the address 1 and the information INF1_1. The signal RS may indicate data corresponding to the address 2 and the information INF1_2. The signal RS may indicate data corresponding to the address 3 and the information INF1_3. For example, if the address is represented by n bits of data and the status information INF1 is represented by m bits of data, the signal RS may be represented by m+n bits of data (where m and n are natural numbers).

The fault occurrence information INF2, the number of safe faults INF3, and the number of severe faults INF4 are stored in the register 121 in a manner similar to the manner in which the status information INF1 is stored in the register 121. The description thereof is omitted.

FIG. 6 is a table showing data stored in the fault controller of FIG. 3 in relation to example recovery information.

As described with reference to FIG. 3, the fault controller 122 may store a look-up table representing the data of the recovery method. More specifically, the fault controller 122 may store data related to the recovered methods each matched to the fault occurrence information in the form of a look-up table.

Hereinafter, referring to FIGS. 2 and 6, example recovery methods for recovering faults occurring in two fault-tolerant IPs 110_1 and 110_2 are described. However, the inventive concept is not limited thereto, and it will be understood that the inventive concept includes all embodiments of recovery methods for recovering faults occurring in one or more fault-tolerant IPs.

In the example of FIG. 6, the fault controller 122 may store data of fault occurrence information represented by 4 bits and data of a recovery method represented by 2 bits.

The 4-bit data of the fault occurrence information may related to the severe fault of the fault-tolerant IP 110_1, the severe fault of the fault-tolerant IP 110_1, and the severe fault of the fault-tolerant IP 110_2 in order from the most significant bit. The data value "0" may indicate that no fault occurs. The data value "1" may indicate that a fault occurs. As an example, the data value "1001" may indicate that a safe fault occurs in the fault-tolerant IP 110_1 and a severe fault occurs in the fault-tolerant IP 110_2.

The two-bit data of the recovery method may represent four recovery methods. As an example, the data value "00" may represent a recovery method that includes an operation for reducing the frequency of the clock provided to the fault-tolerant IP 110_1. As an example, the data value "00" may represent a recovery method that includes an operation for powering down the fault-tolerant IP 110_1. As an example, the data value "10" may represent a recovery method involving communication between the fault-tolerant IPs 110_1 and 110_2. More particularly, the data value "10" may represent a recovery method that includes the operation that the fault-tolerant IP 110_2 outputs specific data to the fault-tolerant IP 110_1. As an example, the data value "11" may represent a recovery method that includes an operation for resetting the fault-tolerant IP 110_1 and the fault-tolerant IP 110_2.

However, it will be understood that the recovery methods according to the embodiment of the inventive concept are not limited to the examples described with reference to FIG. 6, but may be variously modified or added. Referring to FIG. 7, recovery methods will be described in more detail.

If operations involving communication between the fault-tolerant IPs are considered in recovering a fault in a particular fault-tolerant IP, the fault controller 122 may determine a more efficient recovery method. As an example, in recovering a fault that occurs in the fault-tolerant IP 110_1, if operations involving communication between the fault-tolerant IPs 110_1 and 110_2 are considered, more recovery methods may be provided by recovery information (e.g., a look-up table).

For example, if only the operation of the fault-tolerant IP 110_1 is considered to recover a fault occurring in the fault-tolerant IP 110_1, only a recovery method including an operation of resetting the fault-tolerant IP 110_1 by a look-up table may be provided. However, when operations involving communication between the fault-tolerant IPs 110_1 and 110_2 are considered, there are further provided recovery methods including operations for exchanging data between the fault-tolerant IPs 110_1 and 110_2. If more recovery methods are provided by the recovery information, the fault controller 122 may determine a more efficient recovery method.

Although the recovery information implemented in the form of a look-up table is described, the recovery information of the inventive concept is not limited to the example of FIG. 6 and may be implemented in various other forms. As an example, the recovery information may be implemented in any form capable of providing a specific recovery method in response to the specific fault occurrence information.

Although the recovery methods determined based on the fault occurrence information are described with reference to FIG. 6, as described with reference to FIG. 3, the inventive concept may include all embodiments of recovery methods that are determined based on at least one of status information, fault occurrence information, a counted number of faults, and a user's command.

As an example, if the counted number of severe faults is greater than or equal to the reference value (i.e., based on the counted number of faults), the recovery method may include an operation for powering down a particular fault-tolerant IP. The powering down refers to an operation for interrupting the operation of the fault-tolerant IP. As an example, the powering down may include an operation for turning off the power of the fault-tolerant IP. Alternatively, the powering down may include an operation for blocking all signals that are inputted to the fault-tolerant IP.

FIG. 7 is a block diagram illustrating an example configuration of the fault recovery unit of FIG. 1 or 2.

Referring to FIG. 7, the fault recovery unit 130 may include a fault recovery module 131 and a reset module 132. As described with reference to FIGS. 1 and 2, the fault-tolerant IPs 110 and 110_1 to 110_3 of the fault-tolerant system 100 or 100a may operate based on the clock. In the example of FIG. 7, the clock generator 140 may output the clock CLK1 to the fault-tolerant IP 110_1. The fault-tolerant IP 110_1 may operate based on the clock CLK1. The clock generator 140 may output the clock CLK2 to the fault-tolerant IP 110_2. The fault-tolerant IP 110_2 may operate based on the clock CLK2.

The fault recovery module 131 may receive the signal RV from the fault controller 122. The fault recovery module 131 may obtain a recovery method based on the signal RV. The fault recovery module 131 may control the operations of the fault recovery system 100 or 100a according to the recovery method. For example, the fault recovery module 131 may control operations related to the fault tolerant IP where a fault occurs. For example, the fault recovery module 131 may control operations related to the fault-tolerant IPs 110_1 and 110_2 by controlling the reset module 132 and the clock generator 140. Alternatively, the fault recovery module 131 may directly control the operation of the fault-tolerant IPs 110_1 and 110_2. Operations related to the fault-tolerant IP may include operations involving communication between the fault-tolerant IPs 110_1 and 110_2.

Hereinafter, referring to FIG. 7, an embodiment of two fault-tolerant IPs 110_1 and 110_2 controlled by the fault recovery module 131 will be described. However, the inventive concept is not limited thereto and may include all embodiments for one or more fault-tolerant IPs controlled by the fault recovery module 131.

The fault recovery module 131 may generate a signal C1 for controlling the reset module 132. The fault recovery module 131 may generate a signal C2 for controlling the clock generator 140. The fault recovery module 131 may generate a signal C3 for controlling the fault-tolerant IP 110_1. The fault recovery module 131 may generate a signal C4 for controlling the fault-tolerant IP 110_2. The fault recovery module 131 may output the signals C1 to C4 to the reset module 132, the clock generator 140, and the fault-tolerant IPs 110_1 and 110_2, respectively.

The reset module 132 may receive the signal C1 from the fault recovery module 131. The reset module 132 may reset at least one of the fault-tolerant IPs 110_1 and 110_2 in response to the signal C1. Hereinafter, an example recovery control operation performed by the fault recovery unit 130 will now be described with reference to FIGS. 6 and 7.

If a fault occurs in the fault-tolerant IP 110_1 and the fault-tolerant IP 110_2, the fault recovery module 131 may obtain data indicating a recovery method based on the signal RV. The fault recovery module 131 may perform a recovery operation in response to the data value of the obtained data.

The fault recovery module 131 may output a signal C2 for controlling the clock generator 140 in response to the data value "00" of the signal RV. The fault recovery module 131 may adjust the frequency of the clock CLK1 by controlling the clock generator 140 by the signal C2.

As an example, a fault occurring in the fault-tolerant IP 110_1 may be caused by the clock CLK1 of a frequency different from the reference frequency. If the frequency of the clock CLK1 is different from the reference frequency, the clock CLK1 may not be aligned with respect to other signals received by the fault-tolerant IP 110_1. Therefore, the fault-tolerant IP 110_1 may not operate normally. As the frequency of the clock CLK1 is adjusted (increased or decreased) by the signal C2, the clock CLK1 may have a reference frequency.

Alternatively, a fault occurring in the fault-tolerant IP 110_1 may be due to an excessively high frequency clock CLK1. The clock generator 140 may appropriately lower the frequency of the clock CLK1 in response to the signal C2. Based on the adjusted clock CLK1, the fault-tolerant IP 110_1 may operate normally.

The fault recovery module 131 may output a signal C3 for controlling the fault-tolerant IP 110_1 in response to the data value "01" of the signal RV. The fault recovery module 131 may power down the fault-tolerant IP 110_1 by controlling the fault-tolerant IP 110_1 by the signal C3.

As an example, a fault occurring in the fault-tolerant IP 110_1 may not be recovered by the operation of the fault-tolerant system 100 or 100a. Even if the fault-tolerant IP 110_1 is not operating, the fault-tolerant system 100 or 100a may operate normally. As the fault-tolerant IP 110_1 is powered down by the signal C3, faults in fault-tolerant IP 110_1 may no longer occur.

The fault recovery module 131 may output a signal C4 for controlling the fault-tolerant IP 110_2 in response to the data value "10" of the signal RV. The fault recovery module 131 may control the fault-tolerant IP 110_2 by signal C4 to cause the fault-tolerant IP 110_2 to output specific data to the fault-tolerant IP 110_1. Accordingly, an operation involving communication between the fault-tolerant IP 110_2 and the fault-tolerant IP 110_1 may be performed.

As an example, the fault-tolerant IP 110_1 may perform an operation according to a recovery method corresponding to the data value "10" of the signal RV in response to the signal C4. The fault-tolerant IP 110_2 may perform operations involving communication between the fault-tolerant IP 110_2 and the fault-tolerant IP 110_1, corresponding to the operation of the fault-tolerant IP 110_1. As an example, the fault-tolerant IP 110_1 may output a signal to the fault-tolerant IP 110_2. The fault-tolerant IP 110_2 may output a signal to the fault-tolerant IP 110_1 in response to the operation of the fault-tolerant IP 110_1.

As an example, a fault in the fault-tolerant IP 110_1 may be caused by an unoptimized set value. As the communication between the fault-tolerant IP 110_2 and the fault-tolerant IP 110_1 is performed by the signal C4, data related to the fault occurring in the fault-tolerant IP 110_1 is transmitted to the fault-tolerant IP 110_2. Based on the data transmitted from the fault-tolerant IP 110_1, the fault-tolerant IP 110_2 may deliver a new set value for recovering a fault to the fault-tolerant IP 110_1. As the fault-tolerant IP 110_1 operates based on the delivered new set value, the fault may no longer occur in the fault-tolerant IP 110_1.

The fault recovery module 131 may output a signal C1 for controlling the reset module 132 in response to the data value "11" of the signal RV. The fault recovery module 131 may reset the fault-tolerant IP 110_1 and the fault-tolerant IP 110_2 by controlling the reset module 132 by the signal C1.

As an example, more than one command may be stored in the fault-tolerant IP 110_1. Operations of the fault-tolerant IP 110_1 according to two or more commands may conflict with each other. As the fault-tolerant IP 110_1 is reset by the signal C1, the commands stored in the fault-tolerant IP 110_1 may be deleted. Therefore, a fault may no longer occur in the fault-tolerant IP 110_1.

After the fault-tolerant IP 110_1 is reset by the signal C1, in response to the signal received from the fault controller 122 (i.e., the signal RV related to the recovery method determined based on the status information for the fault-tolerant IP 110_1 and the fault-tolerant IP 110_2), the fault recovery module 131 may generate at least one of the signals C3 and C4. The fault recovery module 131 may control the operation of the fault-tolerant IP 110_1 by at least one of the signals C3 and C4.

As an example, if faults that are likely to occur again occur in the fault-tolerant IP 110_1, the fault recovery module 131 may perform a recovery method (i.e., a recovery method corresponding to the data value "11" of the signal RV) for resetting the fault-tolerant IP 110_1. The fault recovery module 131 may control the operation of the fault-tolerant IPs 110_1 to prevent the reoccurrence of faults.

As an example, referring to FIG. 5, based on the information INF1_1, the fault controller 122 may obtain information associated with the specific operation of the fault-tolerant IP 110_1 related to the occurrence of the fault. As an example, information associated with a specific operation performed in the fault-tolerant IP 110_1 may be obtained when a fault occurs. A fault occurring in the fault-tolerant IP 110_1 may be caused by the specific operation. The recovery module 131 outputs the signal C3 to control the fault-tolerant IP 110_1 so that the specific operation is not performed. Therefore, a fault may no longer occur in the fault-tolerant IP 110_1.

Figure 8:
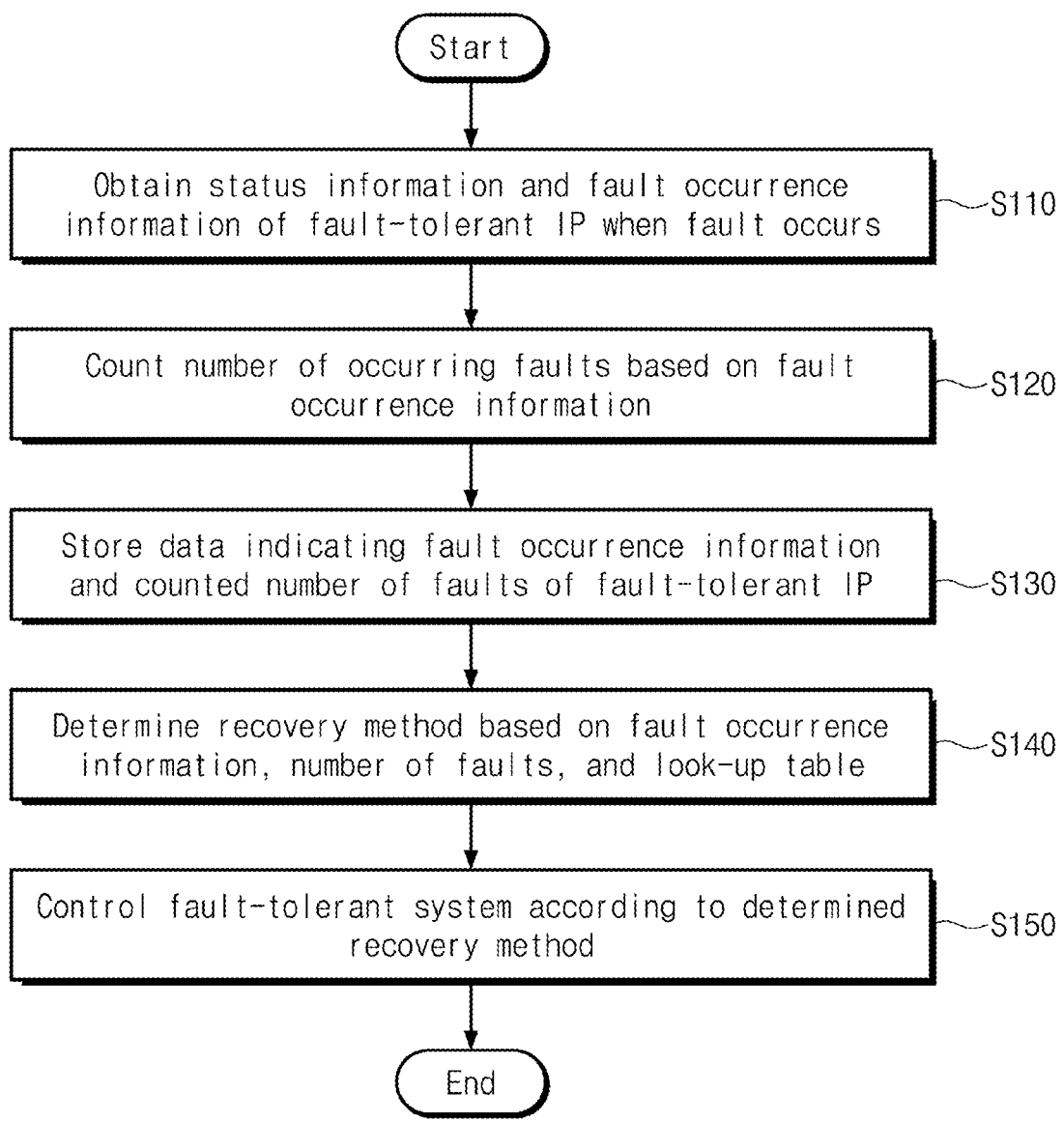
FIG. 8 is a flowchart illustrating an example operation of a fault-tolerant system of FIG. 1 or FIG. 2.

FIG. 8 is a flowchart illustrating an example operation of the fault-tolerant system of FIG. 1 or FIG. 2.

In operation S110, when a fault occurs in the fault-tolerant IP, the fault detector may obtain the fault occurrence information of the fault-tolerant IP. Faults that occur in the fault-tolerant IPs may be either safe or severe faults. As described with reference to FIG. 6, the fault occurrence information may be related to whether the fault that occurs in the fault-tolerant IP is a safe fault or a severe fault.

In operation S120, the fault manager may count the number of faults occurring in the fault-tolerant IP, based on the fault occurrence information obtained in operation S110. The fault manager may count the number of safe faults that occur in a fault-tolerant IP. The fault manager may count the number of severe faults in the fault-tolerant IP.

In operation S130, the register may store data indicating fault occurrence information obtained in operation S110 and a counted number of faults obtained in operation S120. The register may output a signal indicating the stored data to the fault controller.

In operation S140, the fault controller may obtain the fault occurrence information and the number of faults based on the signal received from the register. The fault controller may store a look-up table including data of the recovery methods matched to the fault occurrence information and/or the number of faults, respectively. As an example, a designer of a fault-tolerant system may store look-up tables related to predetermined recovery methods in a fault controller. The fault controller may determine the recovery method based on the fault information, the number of faults, and the look-up table.

In operation S150, the fault recovery module may generate signals for controlling the fault-tolerant system, according to the recovery method determined in operation S140. The fault recovery module may output signals to control the operation of the fault-tolerant system. As an example, the fault recovery module may control the operation of a specific fault-tolerant IP. The fault recovery module controls the reset module to reset the specific fault-tolerant IP. The fault recovery module controls the clock generator to adjust the frequency of the clock provided to the specific fault-tolerant IP.

Figure 9:
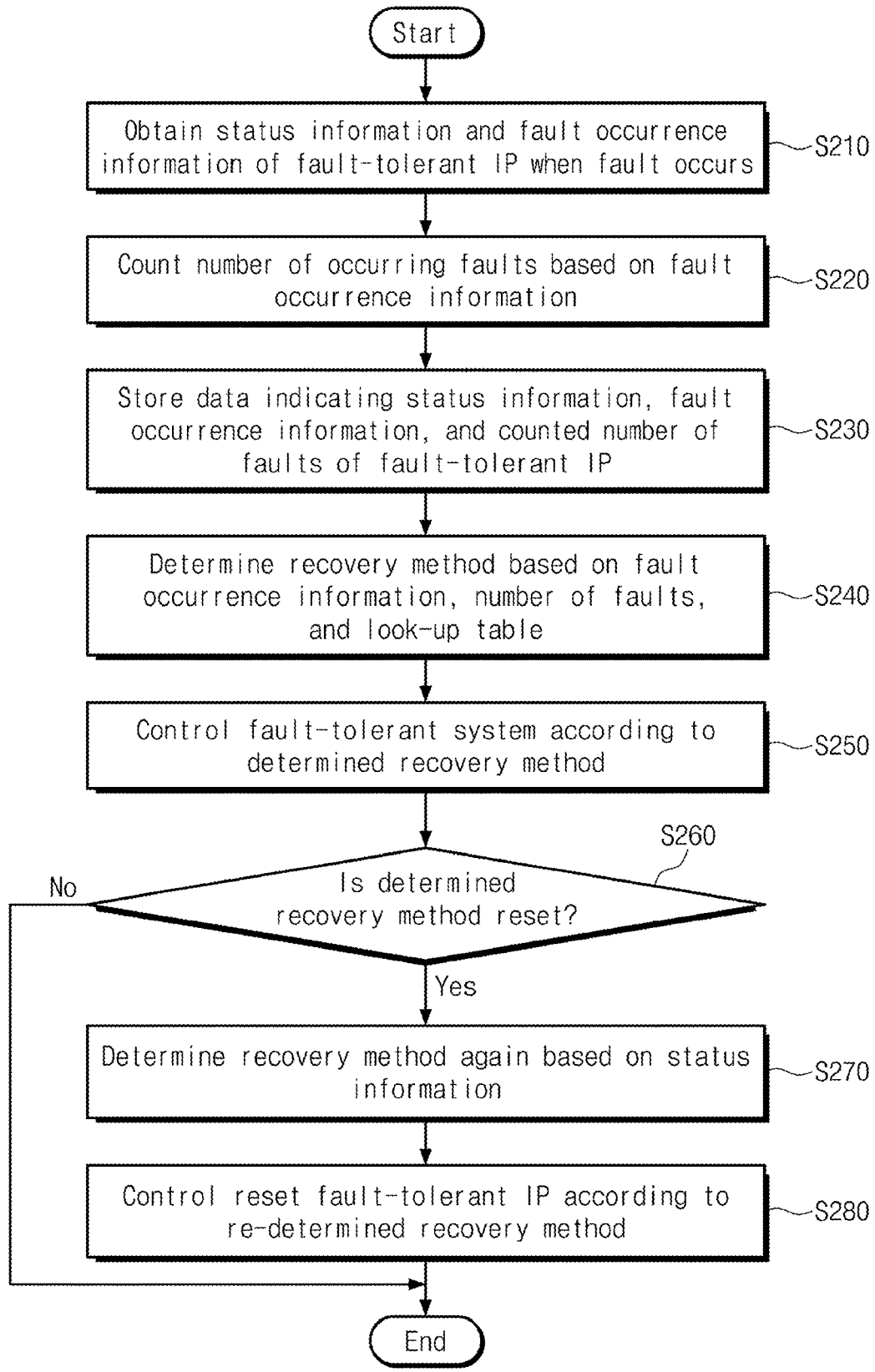
FIG. 9 is a flowchart illustrating an example operation of a fault-tolerant system of FIG. 1 or FIG. 2.

FIG. 9 is a flowchart illustrating an example operation of the fault-tolerant system of FIG. 1 or FIG. 2.

Operations S220 to S230 and S250 in FIG. 9 are similar to operations S120 to S140 and S150 in FIG. 8, respectively, and therefore the description thereof will be omitted.

In operation S210, when a fault occurs in the fault-tolerant IP, the fault detector may obtain status information and fault occurrence information of the fault-tolerant IP. Faults that occur in the fault-tolerant IPs may be either safe or severe faults. For example, as described with reference to FIG. 5, the status information may include information related to the operation performed by the fault-tolerant IP when a fault occurs, information related to the data inputted to the fault-tolerant IP when a fault occurs, and information related to the data outputted from the fault-tolerant IP when a fault occurs.

In operation S240, the fault controller may obtain status information, fault occurrence information, and the number of faults based on the signal received from the register. The fault controller may store a look-up table including data of the recovery methods matched to the fault occurrence information and/or the number of faults, respectively. As an example, a designer of a fault-tolerant system may store look-up tables related to predetermined recovery methods in a fault controller. The fault controller may determine the recovery method based on the fault information, the number of faults, and the look-up table.

In operation S260, the fault controller may determine whether the determined recovery method includes an operation to reset a particular fault-tolerant IP. If the recovery method does not include an operation for resetting a particular fault-tolerant IP, the operation of FIG. 9 may be terminated. If the recovery method includes an operation for resetting a particular fault-tolerant IP, operation S270 may be performed.

In operation S270, the fault controller may obtain status information based on the signal received from the register. The fault controller may again determine the recovery method based on the status information obtained in operation S240.

In operation S280, the fault recovery module may generate signals for controlling the fault-tolerant system, according to the recovery method determined in operation S270. The fault recovery module may output signals to control the operation of the reset fault-tolerant IP in operation S250.

FIG. 10 is a block diagram illustrating a fault-tolerant system according to an embodiment of the inventive concept.

Referring to FIG. 10, a fault-tolerant system 1000 may include a fault-tolerant processor 1100, fault-tolerant caches 1200 and 1300, a fault-tolerant bus 1400, a fault manager 1500, a fault recovery unit 1600, and other IPs 1700. The fault-tolerant processor 1100, the fault-tolerant caches 1200 and 1300, and the fault-tolerant bus 1400 may include fault detectors 1110, 1210, 1310, and 1410, respectively. The fault recovery unit 1600 may include a fault recovery module 1610. Other IPs 1700 may include various components for configuring a semiconductor system. As an example, other IPs 1700 may include at least one of a memory, a storage, a communications device, and a user interface.

The fault-tolerant system 1000 may further include other components not shown in FIG. 10. Alternatively, the fault-tolerant system 1000 may not include one or more of the components shown in FIG. 10. The fault-tolerant system 1000 may include at least one of the fault-tolerant system 100 of FIG. 1 and the fault-tolerant system 100*a* of FIG. 2. The fault-tolerant processor 1100, fault-tolerant caches 1200 and 1300, and the fault-tolerant bus 1400 of FIG. 10 may include the fault-tolerant IP 110 of FIG. 1 and the fault-tolerant IPs 110_1 to 110_3 of FIG. 2, respectively. The fault manager 1500 of FIG. 10 may include the fault manager 120 of FIGS. 1 and 2. The fault recovery unit 1600 of FIG. 10 may include the fault recovery unit 130 of FIGS. 1 and 2.

The configuration and operation of the fault detectors 1110, 1210, 1310, and 1410 are similar to those described with reference to the fault detectors 111 and 111_1 to 111_3, and the description thereof will be omitted. Since the configuration and operation of the fault manager 1500 are similar to those described with reference to the fault manager 120, the following description is omitted. The configuration and operation of the fault recovery unit 1600 are similar to those described with reference to the fault recovery unit 130, and therefore the following description is omitted. The configuration and operation of the fault recovery module 1610 are similar to those described with reference to the fault recovery module 131, and therefore the following description is omitted.

The fault-tolerant processor 1100 may control the overall operation of the fault-tolerant system 1000. The fault-tolerant processor 1100 may process the operations required for operation of the fault-tolerant system 1000 as a central control device. As an example, the fault-tolerant processor 1100 may process data for controlling the operations of the fault-tolerant system 1000 based on the signal INS2 received from the fault-tolerant cache 1200. As an example, the signal INS2 may indicate data for instructing the operation of fault-tolerant processor 1100. The fault-tolerant processor 1100 may exchange data with the fault-tolerant cache 1300 based on the signal DATA1.

As an example, the fault-tolerant processor 1100 may be one of a general-purpose processor, a workstation processor, an application processor, or the like. The fault-tolerant processor 1100 may include one processor core (i.e., single core) or a plurality of processor cores (i.e., multi-core). For example, the fault-tolerant processor 1100 may include a multi-core such as a dual-core, a quad-core, and a hexa-core.

The fault-tolerant caches 1200 and 1300 may temporarily store data received from the fault-tolerant processor 1100 and the fault-tolerant bus 1400. As an example, the fault-tolerant caches 1200 and 1300 may include storage for storing data. The fault-tolerant cache 1200 may receive the signal INS1 from the fault-tolerant bus. As an example, the signal INS1 may indicate data for instructing the operation of fault-tolerant processor 1100. The fault-tolerant cache 1200 may store data obtained from the signal INS1.

For example, the fault-tolerant cache 1300 may exchange signals DATA1 with the fault-tolerant processor 1100 and exchange signals DATA2 with the fault-tolerant bus 1400. The fault-tolerant cache 1300 may store data exchanged by the signals DATA1 and DATA2. The fault-tolerant processor 1100 may exchange data with the fault-tolerant bus 1400 through the fault-tolerant caches 1200 and 1300.

The fault-tolerant bus 1400 may provide a communication path between the fault-tolerant caches 1200 and 1300 and other IPs 1700. The fault-tolerant caches 1200 and 1300 may exchange data with other IPs 1700 through the fault-tolerant bus 1400. The fault-tolerant bus 1400 may be configured to support various types of communication formats used in the fault-tolerant system 1000.

The fault manager 1500 may obtain fault information for faults occurring in the fault-tolerant processor 1100, the fault-tolerant caches 1200 and 1300, and the fault-tolerant bus 1400 based on signals received from the fault detectors 1110, 1210, 1310, and 1410. The fault manager 1500 may determine recovery methods for recovering faults based on the fault information.

The fault recovery module 1610 may obtain information on the recovery method based on the signal received from the fault manager 1500. Depending on the recovery method, in order to recover faults occurring in the fault-tolerant processor 1100, the fault-tolerant caches 1200 and 1300, and the fault-tolerant bus 1400, the fault recovery module 1610 may control operations involving communications between the fault-tolerant processor 1100 and fault-tolerant processor 1100, and the fault-tolerant caches 1200 and 1300 and the fault-tolerant bus 1400.

For example, data stored in the fault-tolerant cache 1300 may be lost. According to the control of the fault recovery module 1610, the fault-tolerant processor 1100 may read the lost data stored in the fault-tolerant cache 1300 through the signal DATA1. The fault-tolerant processor 1100 may transmit new data through the signal DATA1 to recover the lost data. The fault-tolerant cache 1300 may store new data instead of the lost data. Thus, faults in the fault-tolerant cache 1300 may be recovered by communication between the fault-tolerant processor 1100 and the fault-tolerant cache 1300.

According to the embodiment of the inventive concept, faults occurring in the IPs may be efficiently recovered in consideration of the relationship of the IPs included in the semiconductor system.

Although the example embodiments of the present invention have been described, it is understood that the present invention should not be limited to thereto but various changes and modifications can be made by one ordinary skilled in the art within the spirit and scope of the present invention as hereinafter claimed.

What is claimed is:

1. A semiconductor system comprising:
    a fault detection circuit configured to obtain fault information related to a fault occurring in a first processor;
    a fault management circuit configured to store recovery information providing one or more recovery methods related to the fault information and determine a recovery method for recovering the fault occurring in the first processor among the one or more recovery methods based on the recovery information; and
    a fault recovery circuit configured to control the first processor based on the determined recovery method,
    wherein the determined recovery method involves communication between the first processor and a second processor and the fault occurring in the first processor is recovered by the second processor based on data delivered according to the communication between the first processor and the second processor, wherein the fault comprises a first fault recovered by an operation of the first processor or a second fault recovered by an operation of the fault recovery circuit, and wherein the fault information is related to whether the fault is the first fault or the second fault.

2. The semiconductor system of claim 1, wherein the fault information is related to a number of the first fault and a number of the second fault.

3. The semiconductor system of claim 1, wherein the fault information is related to an operation performed by the first processor in relation to the occurrence of the fault in the first processor.

4. The semiconductor system of claim 1, wherein the fault information is related to data inputted to the first processor and data outputted from the first processor in relation to the occurrence of the fault in the first processor.

5. The semiconductor system of claim 1, wherein the one or more recovery methods comprise a recovery method for resetting the first processor.

6. The semiconductor system of claim 1, wherein the one or more recovery methods comprise a recovery method for adjusting a frequency of a clock provided to the first processor.

7. The semiconductor system of claim 1, wherein the recovery information is stored in a look-up table for providing the one or more recovery methods matching the fault information.

8. A semiconductor system comprising:
a first processor configured to operate according to a recovery method such that a fault is recovered in response to a control signal received, when the fault occurs in a first operation; and
a second processor configured to perform a second operation related to the first processor so that a fault of the first processor is recovered in correspondence to the first operation of the first processor according to the recovery method,
a fault management circuit configured to determine the recovery method based on the fault information; and
a fault recovery circuit configured to output the control signal in relation to the determined recovery method,
wherein the second operation related to the first processor involves communication between the first processor and the second processor,
wherein as data is delivered between the first processor and the second processor through the communication between the first processor and the second processor, a fault of the first processor is recovered by the second processor,
wherein the first processor comprises a fault detection circuit configured to obtain fault information related to the recovered fault, and wherein the first processor operates based on a clock having a frequency that is adjusted by the fault recovery circuit.

9. The semiconductor system of claim 8, further comprising a reset circuit configured to reset at least one of the first processor and the second processor according to a control of the fault recovery module.

10. The semiconductor system of claim 8, wherein the fault manager comprises a controller further configured to determine the recovery method for recovering the fault of the first processor among one or more recovery methods, based on recovery information that provides the one or more recovery methods related to the fault information.

11. A semiconductor system comprising:
a fault detection circuit configured to obtain fault information related to a fault occurring in a first processor; and
a fault management circuit configured to determine a first recovery method for recovering the fault occurring in the first processor among one or more recovery methods related to the fault information;
wherein the one or more recovery methods comprise a recovery method involving communication between the first processor and a second processor for recovering the fault occurring in the first processor,
wherein the fault management circuit is further configured to determine a second recovery method for controlling the reset of the first processor based on the fault information after the first processor is reset according to the first recovery method, in a case where the first recovery method is a recovery method for resetting the first processor,
wherein the semiconductor system further comprises a fault recovery circuit configured to control an operation for resetting the first processor according to the first recovery method and to control the first processor according to the second recovery method so as to recover the fault occurred in the first processor.

12. The semiconductor system of claim 11, further comprising:
a clock generation circuit configured to provide a clock of a frequency adjusted according to a control of the fault recovery module to at least one of the first processor and the second processor; and
a reset circuit configured to reset the first processor according to a control of the fault recovery circuit.

13. The semiconductor system of claim 11, wherein the fault management circuit comprises a memory configured to store recovery information that provides the one or more recovery methods related to the fault information,
wherein the recovery information is stored in a look-up table for providing the one or more recovery methods matching the fault information.

* * * * *